Dec. 24, 1968      A. J. VARRIN      3,417,650
RETAINING RING
Filed Sept. 26, 1966
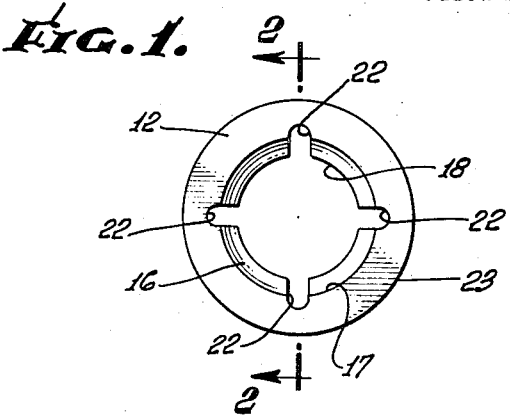
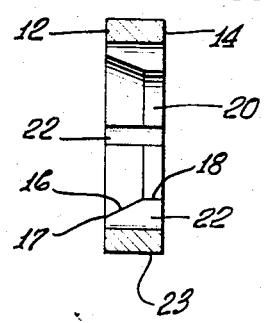
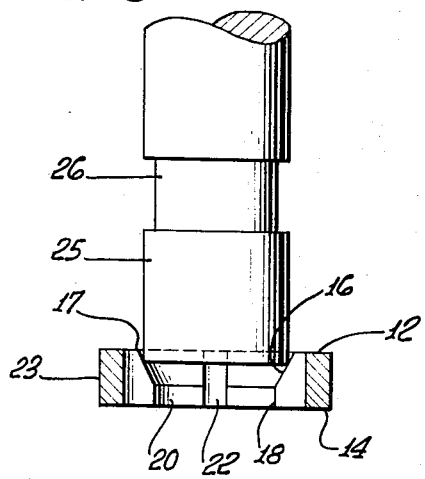
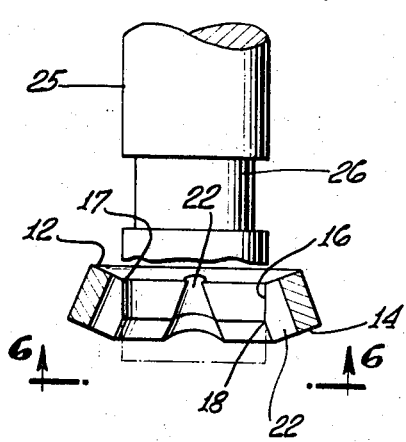
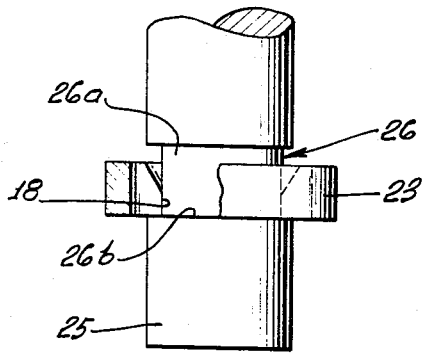
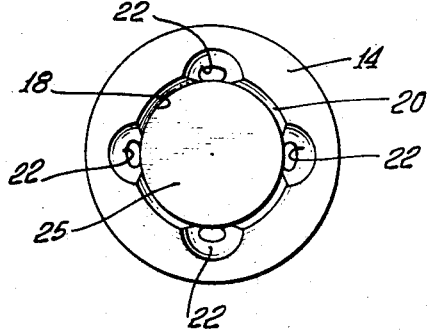
INVENTOR
ANDRE J. VARRIN
by Gordon H. Olson
ATTORNEY.

United States Patent Office 3,417,650
Patented Dec. 24, 1968

3,417,650
RETAINING RING
Andre J. Varrin, Long Beach, Calif., assignor to International Telephone and Telegraph Corporation, New York, N.Y., a corporation of Maryland
Filed Sept. 26, 1966, Ser. No. 582,135
8 Claims. (Cl. 85—8.8)

ABSTRACT OF THE DISCLOSURE

A deformable retaining ring adapted to be snapped into an annular groove on a shaft. The ring has a chamfered inner surface on one end and a series of spaced axially extending grooves on its inner surface between the end faces of the ring. The grooves permit temporary enlargement of the ring so that it may be forced onto the shaft. The ring snaps into the annular shaft groove when in axial alignment therewith.

---

This invention relates to a retaining ring to be snapped into an annular groove on a shaft or similar cylindrical member to provide a thrust surface or locking surface for connecting another member to the shaft, retaining a shaft in a bore or any similar application where a rod or a shaft requires retention.

The retaining ring of the invention is to be made of slightly deformable material which will return to its original shape when stretched a limited amount, such as plastic or similar material. The inner surface of one end of the ring is formed with a chamfer which tapers from an outer diameter adjacent one axial face of the ring to an inner smaller diameter defining a cylindrical portion of the ring. This chamfered surface facilitates the assembly of the ring to a shaft having an outer diameter slightly less than the first diameter of the ring but considerably larger than the inner diameter of the ring. To enable the ring to be forced onto the shaft, it is provided with a plurality of axially extending grooves between the end faces of the ring. The grooves have a radial dimension greater than the radial dimension of the chamfer with the result that the grooves permit the inner diameter of the ring to be stretched or forced onto a shaft until it reaches an annular groove formed in the shaft wherein the ring snaps to its original shape so that the unchamfered end of the ring provides a thrust surface engaging the axial face of the groove within the shaft.

While there are a wide variety of devices available for performing some of the same functions of the retaining ring described herein, such as washer type elements having inwardly extending fingers for gripping a shaft and snap rings which snap into a groove on a shaft, there are certain advantages provided by the arrangement described herein. The retaining ring of the invention not only serves to retain one item to another but also provides a strong one piece continuous bearing surface. Being preferably made of plastic, the retaining ring can also serve as an insulator, will not corrode or cause electrolysis problems. At the same time, it is low in cost but can be easily fabricated or moulded into a variety of different configurations. In certain applications, it can eliminate a thrust washer which would be necessary with certain prior art retaining elements.

For a greater understanding of the retaining ring of the invention, reference may be had to the following description and drawings in which:

FIG. 1 shows an end view of the retaining ring;
FIG. 2 is a cross-sectional view of the ring;
FIGS. 3, 4 and 5 show the steps of installing the retaining ring on a shaft; and
FIG. 6 is an end view of the device as seen in FIG. 4 during assembly.

Referring now to the drawings, the retaining ring of the invention may be seen to have a relatively thin axial dimension or thickness extending from a front or lead-in axial surface 12 to a rear or thrust axial surface 14. A chamfered surface 16 is formed on the inner wall of the ring extending from the first or outer diameter at 17 on the axial face 12 and tapering to a smaller inner diameter at 18 which defines an inner cylindrical portion 20 of the ring. Note that the chamfered surface 16 has an axial dimension forming a substantial portion of the thickness of the ring in that it is greater in axial thickness than cylindrical portion 20.

To permit temporary enlargement of the ring as it is inserted on the shaft, there are provided four axially extending generally U-shaped grooves 22 which extend from the forward surface 12 to the rear surface 14. These grooves are preferably equally spaced around the inner surface of the ring, as shown. The radial depth of the grooves 22 may be seen to extend from the inner diameter 18 to a point radially beyond the outer diameter 17. Or in other words, the radially outer ends of the grooves 22 or the bottom of the grooves define a circle having a diameter greater than diameter 17. It should also be noted that the radial depth of the grooves in the cylindrical portion 20 is slightly greater than the radial dimension extending between the bottom of the grooves and the outer diameter 23 of the ring. Stated differently, it can be said that the radial depth of the grooves is more than ½ the radial thickness of the cylindrical portion 20.

As can be seen from FIG. 3, the outer diameter 17 of the inner surface of the ring is greater than the outer diameter of a shaft 25 having an annular groove 26 onto which the retaining ring is to be mounted. However, the shaft diameter is considerably larger than the inner diameter 18 of the cylindrical portion 20. Consequently, the ring cannot be simply slipped onto the shaft but must be forced in that direction. The lead-in chamfered surface 16 facilitates insertion of the shaft into the ring or the ring onto the shaft, and an axial force applied to the ring causes it to deform and snap into the position shown in FIG. 4 wherein the chamfered surface 16 is engaging the shaft surface in parallel relation, and the end surfaces 12 and 14 of the ring are oriented at an oblique angle with respect to the shaft axis rather than in the perpendicular relation illustrated in FIG. 3. While the chamfered surface 16 provides the mechanical advantage which permits the ring to be forced onto the shaft, the grooves 22 permit the temporary enlargement of the ring inner diameter 18 to equal the shaft diameter. The effect of this action may be seen in the end view of FIG. 6, wherein the open ends of the grooves have been stretched outwardly to give the grooves more of an open shape. From the illustrations in FIGS. 4 and 6, it can also be appreciated that the axial dimension of cylindrical portion 20 must be kept relatively small to permit the ring to snap into such position. Or in other words, if the chamfered surface 16 were considerably smaller than the cylindrical portion 20, it would not be possible to deform the ring as shown with the ring material being only slightly deformable.

FIG. 5 illustrates the ring completely assembled to the shaft wherein the ring has snapped into the shaft groove 26 and has returned to its original shape. In this position, the cylindrical portion of the ring fits snugly around the annular surface 26a of the groove 26 and the axial end surface 14 of the ring serves as a substantial thrust surface engaging the axial surface 26b of the groove 26 to thereby prevent removal of the retaining ring in that direction without permanent deformation of the ring. It can be appreciated that with the arrangement shown the ring is capable of withstanding a considerable axial thrust. Also, the surfaces of the ring are well suited to serve as bearing surfaces for adjacent rotating elements.

In view of the foregoing description, it can be appreciated that the retaining element is very simple but effective. While only the preferred embodiment of the ring has been illustrated, it should be understood that various changes and modifications will readily come to the mind of one skilled in the art. Accordingly, it is intended that all such variations and modifications that fall within the true spirit and scope of the invention be included in the appended claims.

What is claimed is:

1. A retaining ring made of elastomeric material which can be temporarily stretched a limited amount after which it will return to its original shape, one end of said ring having a chamfered inner surface tapering from a first diameter at an outer end face thereon to a smaller inner diameter intermediate the axial end faces of said ring, means defining a plurality of angularly spaced grooves in the inner wall of said ring extending between the axial end faces of the ring, the radially outer bottoms of said grooves defining a diameter greater than said first diameter, and the axial dimension of said ring being substantially less than the outer diameter thereof.

2. The retaining ring of claim 1 wherein the axial dimension of said chamfered surface is greater than one-half the axial dimension of said ring.

3. The retaining ring of claim 2 wherein said smaller inner diameter marking one end of said chamfered surface marks the start of a cylindrical portion of said ring extending to the other face of said ring.

4. The retaining ring of claim 1 wherein said grooves have a generally U-shaped cross-section, the radial dimension of said grooves from said inner diameter to the radially outer bottom of said grooves is greater than the dimension from the bottom of said grooves to the outer diameter of said ring.

5. The retaining ring of claim 1 in combination with a shaft having an annular groove formed in its outer surface with said retaining ring being positioned in said annular groove, the outer diameter of the main portion of said shaft being slightly less than said first ring diameter and being greater than said ring inner diameter, and said shaft annular groove diameter being slightly less than said ring inner diameter.

6. The retaining ring of claim 1 wherein said chamfered surface defines an angle of approximately 30° with respect to the axis of said ring.

7. The invention of claim 1 wherein said ring is made of deformable plastic which will return to its original shape after being stretched said limited amount.

8. The invention of claim 1 wherein said ring includes four of said grooves, and said grooves are equally spaced.

References Cited
UNITED STATES PATENTS
2,913,284 11/1959 Zankl _____ 85—8.8
3,205,760 9/1965 Seckerson et al. _____ 85—82

FOREIGN PATENTS
1,368,002 7/1964 France.

CARL W. TOMLIN, *Primary Examiner.*

R. S. BRITTS, *Assistant Examiner.*

U.S. Cl. X.R.

287—53